US012567071B2

(12) United States Patent (10) Patent No.: US 12,567,071 B2
Ben-Avi et al. (45) Date of Patent: Mar. 3, 2026

(54) SYSTEM, DEVICE AND METHOD FOR DIGITAL PAYMENT

(71) Applicant: NAYAX LTD., Herzliya (IL)

(72) Inventors: David Ben-Avi, Herzeliyya (IL); Guy Rosenhoiz, Herzeliyya (IL)

(73) Assignee: NAYAX LTD., Herzliya (IL)

( * ) Notice: Subject to any disclaimer, the term of this patent is extended or adjusted under 35 U.S.C. 154(b) by 0 days.

(21) Appl. No.: 18/688,353

(22) PCT Filed: Dec. 5, 2022

(86) PCT No.: PCT/IL2022/051290
§ 371 (c)(1),
(2) Date: Feb. 29, 2024

(87) PCT Pub. No.: WO2023/126911
PCT Pub. Date: Jul. 6, 2023

(65) Prior Publication Data
US 2024/0362632 A1 Oct. 31, 2024

(30) Foreign Application Priority Data
Jan. 3, 2022 (IL) .......................................... 289584

(51) Int. Cl.
*G06Q 20/40* (2012.01)
*G06Q 20/10* (2012.01)
*G06Q 20/36* (2012.01)

(52) U.S. Cl.
CPC ......... *G06Q 20/4014* (2013.01); *G06Q 20/10* (2013.01); *G06Q 20/36* (2013.01)

(58) Field of Classification Search
CPC ..... G06Q 20/4014; G06Q 20/10; G06Q 20/36
See application file for complete search history.

(56) References Cited

U.S. PATENT DOCUMENTS

| | | | |
|---|---|---|---|
| 8,868,467 B2 * | 10/2014 | Serebrennikov | ....... G06Q 20/34 705/75 |
| 2014/0214664 A1 | 7/2014 | Kim et al. | |
| 2015/0161597 A1 | 6/2015 | Subramanian et al. | |
| 2015/0220914 A1 * | 8/2015 | Purves | ................. G06Q 20/405 705/41 |

(Continued)

FOREIGN PATENT DOCUMENTS

| | | | | |
|---|---|---|---|---|
| KR | 101187856 B1 | 10/2012 | | |
| WO | 2015130967 A1 | 9/2015 | | |
| WO | WO-2016137300 A1 * | 9/2016 | ............. | G06Q 20/02 |

OTHER PUBLICATIONS

PCT International Search Report for International Application No. PCT/IL2022/051290, mailed Feb. 1, 2023, 3pp.

(Continued)

*Primary Examiner* — Peter D Nolan
*Assistant Examiner* — Matthew Cobb
(74) *Attorney, Agent, or Firm* — The Roy Gross Law Firm, LLC; Roy D. Gross

(57) ABSTRACT
A system and a method for executing payments over a communication network are presented. The system performs payments over the communication network by using a payment element. The payment element includes a user identification string. The payment element is installed in a user digital wallet application at a user device to perform a payment.

24 Claims, 8 Drawing Sheets

(56)  References Cited

U.S. PATENT DOCUMENTS

| | | |
|---|---|---|
| 2015/0278815 A1 | 10/2015 | Randazza et al. |
| 2016/0253652 A1 | 9/2016 | Je et al. |
| 2018/0225442 A1 * | 8/2018 | Ranadive ............... G06F 21/34 |
| 2022/0188786 A1 * | 6/2022 | Ranganathan ..... G06Q 20/3221 |

OTHER PUBLICATIONS

PCT Written Opinion for International Application No. PCT/IL2022/051290, mailed Feb. 1, 2023, 3pp.

Israel Patent Office, Search Report—ILPO for Israeli Patent Application No. 289584, dated Mar. 27, 2022, 2pp.

European Patent Office, Supplementary European Search Report for European Patent Application No. 22915352.3, dated Jun. 24, 2025, 9pp.

* cited by examiner

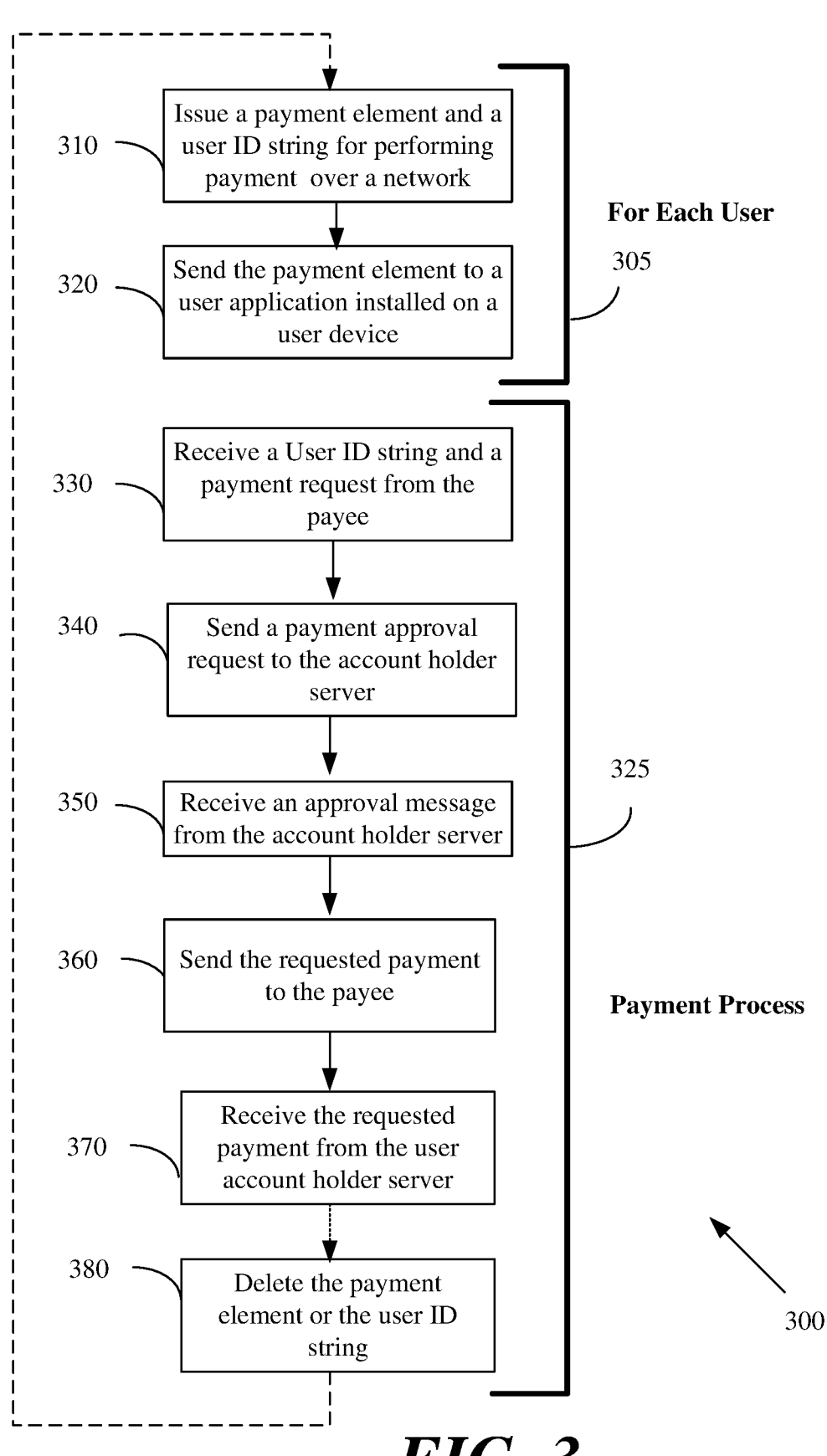

310 — Issue a payment element and a user ID string for performing payment over a network 320 — Send the payment element to a user application installed on a user device For Each User
305

330 — Receive a User ID string and a payment request from the payee

340 — Send a payment approval request to the account holder server

350 — Receive an approval message from the account holder server

325

360 — Send the requested payment to the payee

370 — Receive the requested payment from the user account holder server

Payment Process

380 — Delete the payment element or the user ID string

Payment Request Message

Payment Confirmation Message

Approval Request Message

Reply Message

User ID string

SYSTEM, DEVICE AND METHOD FOR DIGITAL PAYMENT

TECHNICAL FIELD

Some embodiments described herein generally relate to a payment system and method, more specifically to digital payments over a digital network.

BACKGROUND

A digital payment system may enable to make purchases in virtual stores over the Internet and physical stores using digital wallets. Those systems may use the user's credit card or other payment methods such as, for example, Pay Pal, crypto coins, or the like to pay for the merchandise.

However, in order to use the digital wallet, a payment card is needed to be uploaded to the digital wallet application. Thus, users without a payment card can not use the digital wallet application.

SUMMARY

Embodiments related to a system, a method, and a product for purchasing goods and services are described hereinbelow by the ways of example only.

One example embodiment may include a payment server comprising a processing circuitry, wherein the processing circuitry is configured to: issue a payment element for performing one or more payments over a communication network, wherein the payment element comprises a user identification string; send the user identification string to a user application installed on a user device; receive a payment request message from a payment receiving unit when a payment is made by providing the user identification string to the payment receiving unit by the user device; send a purchase approval request message to a user account holder server, and send a reply message as a response to the payment approval request to the payment receiving unit.

For example, the reply message comprises an approval message, and the processing circuity is configured to send the requested payment to the payment receiving unit and receive from the user account holder server a payment based on the requested payment.

For example, the user identification string comprises at least one of a user identification number, a user code, an account number and a telephone number.

For example, the user identification string is encrypted.

For example, when the reply message comprises a denial message, the processing circuity is configured to send a denial message to the payment receiving unit.

For example, when the reply message comprises an approval message, the processing circuity is configured to send the payment request message to the user account holder server and receive a payment confirmation message from the user account holder server.

For example, the processing circuity is configured to request a deletion of the payment element after a completion of the payment process at the user application in the user device; issue a new payment element for the user to be used at the next payment, wherein the new payment element comprises a new user identification string, and sent the new payment element to the user application at the user device.

For example, the payment request message comprises the user identification string, a requested amount of payment, a payment method, and payee data.

For example, the payment confirmation message comprises at least one of a date of the payment, user data, account holder details, payee data, a payment method and a requested amount for payment to a payee.

For example, the approval request message comprises at least the user identification string, payee data, a payment method and a requested amount of payment.

For example, the user account holder comprises an at least one of a bank and a bank hub.

For example, the user application comprises a digital wallet.

For example, the user device comprises at least one of: a desktop computer, a laptop computer, a mobile device, or a cellphone.

One other embodiment may include a product comprising one or more tangible computer-readable non-transitory storage media comprising program instructions for performing payments over a communication network, wherein execution of the program instructions comprising issuing a payment element for performing one or more payments over the communication network, wherein the payment element comprises a user identification string, sending the user identification string to a user application installed on a user device, receiving a payment request message from a payment receiving unit when a payment is made by providing the user identification string to a payment receiving unit by the user device, sending a purchase approval request message to a user account holder server, and sending a reply message as a response to the payment approval request to the payment receiving unit.

For example, when the reply message comprises an approval message, the execution of the program instructions comprises sending the requested payment to the payment receiving unit and receiving from the user account holder server a payment based on the requested payment.

For example, when the reply message comprises a denial message, the execution of the program instructions comprises sending a denial message to the payment receiving unit.

For example, when the reply message comprises an approval message, the execution of the program instructions comprises sending the payment request message to the user account holder server and receiving a payment confirmation message from the user account holder server.

For example, the execution of the program instructions comprises requesting a deletion of the payment element after a completion of the payment process at the user application in the user device, issuing a new payment element for the user to be used at the next payment, wherein the new payment element comprises a new user identification string, and sending the new payment element to the user application at the user device.

One other example of an embodiment comprises a payment server comprising a processing circuitry, wherein the processing circuitry is configured to: receive a user identification string from a user account holder server, wherein the user identification string is configured to be connected with a user account at the user account holder server without exposing other details of the user to a payment receiving unit; issue a payment element based on the user identification string; send the payment element to a user application installed on a user device and configured to perform payment using the payment element at a payment receiving unit; and perform a payment transaction with the payment receiving unit.

For example, the payment transaction comprises: sending a payment request message to the payment server; receiving at the payment server the payment request message from the payment receiving unit; when a payment is made, the payment server is configured to send a purchase approval request message to the user account holder server; and send a reply message as a response to the payment approval request to the payment receiving unit.

For example, the payment server is configured to: perform a registration session with the user device, wherein the registration session comprises: receive a user identification string from the user device; and issue a payment element based on the identification string, wherein the payment element is to be downloaded and installed on a payment application at the user device.

For example, the payment server is configured to: perform a registration session with the user device, wherein the registration session comprises: receiving user information from the user device; receiving an identification string from a user account holder server, and issue a payment element based on the identification string, wherein the payment element is to be downloaded and installed on a payment application at the user device.

For example, wherein the user information comprises a user name, a user address, a user email address, a user identification number, and a user bank account details.

It is understood from the present disclosure described a solution for shortcomings in the field of art. More specifically, the embodiments described herein enable to pay for purchases using a user ID string.

BRIEF DESCRIPTION OF THE DRAWING

FIG. 3 illustrates a flow chart of a method for performing payments over a network, according to a second demonstrative embodiment.

DETAILED DESCRIPTION

Figure 1:
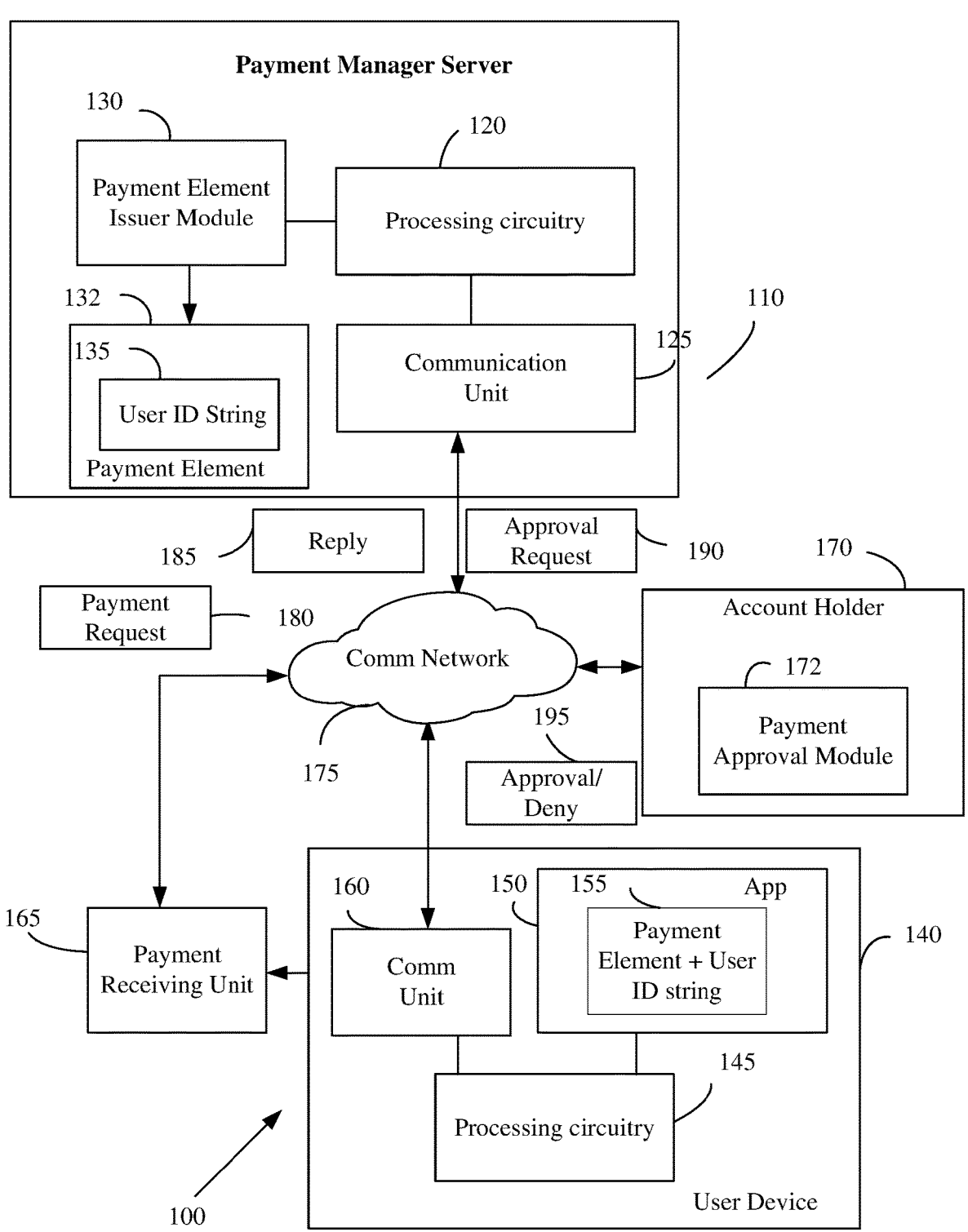
FIG. 1 illustrates a block diagram of a system for performing payments over a network according to some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions made herein utilizing terms such as, for example, "processing," "computing," "calculating," "determining," "establishing," "analyzing," "checking," or the like, may refer to operation(s) and/or process(es) of a computer, a computing platform, a computing system, or other electronic computing devices, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object merely indicate that different instances of like objects are being referred to and are not intended to imply that the objects so described must be in a given sequence, either temporally, spatially, in ranking, or any other manner.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some demonstrative embodiments, the circuitry may be implemented in, or functions associated with the circuitry may be implemented by one or more software or firmware modules. In some demonstrative embodiments, the circuitry may include logic, at least partially operable in hardware.

The term "logic" may refer, for example, to computing logic embedded in the circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in and/or implemented as part of various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read-only memory, programmable memory, magnetic memory, flash memory, persistent memory, and the like. Logic may be executed by one or more processors using memory, e.g., registers, stuck, buffers, and/or the like, coupled to one or more processors, e.g., as necessary to execute the logic.

The term "module," as used hereinbelow, is an object file that contains code to extend the running kernel environment.

As used herein, the term "software engine" as used hereinbelow is an object file that contains code to extend the running kernel environment.

The term "loyalty club customer" as used hereinbelow is a business to business (B2B) customer who has a loyalty club offering and operates a loyalty-based mobile service, e.g., loyalty card application for his customer base.

The term "Backend Platform" as used hereinbelow is a cloud platform, backend server, of the digital wallet system, which is configured to manage and control the digital wallet services, and to interact with selected third-party systems, and with the digital wallet module and/or digital wallet engine and/or digital wallet software development kit (SDK).

The term "EMV," as used hereinbelow, is a payment method based upon a technical standard for smart payment cards and for payment terminals and automated teller machines. EMV originally stood for "Europay, Mastercard, and Visa," the three companies which created the global payment standard.

The term "EMV terminal," as used hereinbelow, is a payment terminal also known as a Point of Sale (POS) terminal, credit card terminal, etc. The EMV terminal is a device that interfaces with payment cards, e.g., Europay, Mastercard, Visa, to make electronic funds transfers. The terminal typically consists of a secure keypad for entering a PIN, a screen, a means of capturing information from payments cards, and a network connection to access the payment network for authorization.

In some demonstrative embodiments, the payment terminal may allow a merchant to capture required credit and/or debit card information and transmit this data to the merchant services provider and/or bank for authorization and transfer funds to the merchant. The terminal may allow the merchant and/or their client to swipe, insert and/or hold a card near the device to capture the information.

The term "Issuer NFC-EMV SDK," as used hereinbelow, may include, for example, an SDK issued and governed by the Issuers. For example, such SDK may be supported by a single Issuer which, when integrated into a mobile application, allows for the communication of a Payment element to an EMV terminal through an NFC protocol.

The term "Server-Side SDK" as used hereinbelow, is the front-end digital wallet software program. In some demonstrative embodiments, this program may reside and be integrated within a customer platform and may manage the front-end payment interaction of the end-user through the connection between the customer platform and the Customer mobile application. For example, the transaction may be managed by the customer platform against a vendor POS that the Customer Platform may be connected to.

The term "customer relationship manager (CRM) application programming interface (API)," as used hereinbelow, is an API configured to communicate with a customer CRM. The customer CRM is configured to manage one or more customer rewards programs.

The term "Credit Card Issuer," as used hereinbelow, may be a global company, e.g., a credit union, that is configured to issue Credit Cards or payment cards or provide others, e.g., banks or other credit unions or other businesses, the right to issue Credit Cards and extend credit to their customers ("Issuer.")

The term "a payment service provider (PSP)" as used hereinbelow, may be a global company, e.g., a credit union, that is configured to issue Credit Cards or payment cards and/or other payment means and to pay for purchases made with the issued card.

The term "Credit Card Scheme," as used hereinbelow, may include payment networks linked to credit cards and/or debit cards and/or prepaid cards or the like, e.g., payment cards, of which a bank and/or any other eligible financial institution and/or credit can be members. For example, members of the credit card scheme may issue cards and/or merchants operating on the network of that card scheme. The members can also set the various rules and limits of their schemes.

The term "Issuer Platform," as used hereinbelow, may include, for example, the Mastercard, Visa, EuroPay, American Express, etc., servers, which may be configured to allow for the issuing of cards.

The term "Card/s," as used hereinbelow, may include, for example, the prepaid card created and issued by an issuer, credit cards, debit cards or the like.

The term "Merchant POS," as used hereinbelow, may include, for example, the credit card terminal of a specific merchant and/or vendor and/or shop and/or etc., on which various payment transactions can be made when an End-User decides to consume a payment transaction using his Customer Mobile application.

The term "Customer Platform," as used hereinbelow, may include, for example, the technology platform of a customer of a partner which is configured to engage with the digital wallet for the provision of payments through the digital wallet platform. The backend technology platform communicates with the Customer Mobile Application as well as with the digital wallet SDK, depending on the payment configuration chosen by the customer and/or partner. For example, this platform will be cloud-based, running on, for example, Amazon Web Services (AWS) and/or Microsoft AZURE.

The term "Customer Credit Card Terminal," as used hereinbelow, may include a transaction terminal, EMV and/or non-EMV, which may be used by the Customer platform to generate a payment element for each End-User credit card associated with the customer mobile application. For example, such terminals may reside with a payments gateway company or processor company The term "customer mobile application," as used hereinbelow, may include at least one application which is installed on the customer mobile device, for example, the loyalty club application, e-Wallet application, or the like. The customer mobile application may include the digital wallet SDK and may interact with the digital wallet platform and the customer platform. The customer mobile application may be configured to run on a mobile device operating system, such as, for example, iOS and Android or React.

The term "customer CRM," as used hereinbelow, may include, for example, the loyalty club platform that the customer uses to manage his customers base and his reward schemes and such other programs across various segments and plans.

The term "digital wallet rules engine," as used hereinbelow, may include, for example, an admin system where the customer can define various rules, including Merchant Category Code (MCC), wherein the MCC includes universal codes on the card scheme that define the various purchase/ merchants categories, such as, for example, clothing, sports shoes, etc. codes, and limitations, etc., for transactions made by the end-users.

The term "End-User," as used hereinbelow, may include one or more users who use the customer mobile application.

The term "Payment element," as used hereinbelow, may include a unique placeholder called a payment element which is configured to include encrypted information of a payment ability of the user, for example, a credit card, a debit card, bank money transfer information, or the like. For example, if a card number is 1234 5678 8765 4321, the payment element identification may be, for example, E67TL8GC27X. In some demonstrative embodiment, the payment element may be configured to access, retrieve, and maintain, for example, a customer's credit card information to ensure a higher level of security for both the customer and the business. The payment element may be saved on the customer platform and/or on the customer's mobile application.

The term "Payment element Service Provider (TSP)," as used hereinbelow, is an entity certified by, for example, MasterCard, Visa, or any other issuers, which are allowed to generated EMV payment elements. The TSP may include an entity within the payments ecosystem that is configured to provide registered payment element requestors. For example, the merchants holding the card credentials—with 'surrogate' Primary Account Number (PAN) values, otherwise known as payment elements. For example, the service may be provided by gateway services if desire.

Reference is made first to FIG. 1, which illustrates a block diagram of a system 100 for performing payments over a network 175 according to some demonstrative embodiments.

In some demonstrative embodiments, system 100 may include a payment manager server 110 configured to manage payments over the network 175 by one or more payment applications 150. For example, a payment application may be installed on a user device 140.

In some demonstrative embodiments, payment server 110 may include a processing circuitry 120. For example, the processing circuitry 120 may be operably coupled with a payment element issuer module 130 and a communication unit 125.

For example, processing circuitry 120 may include circuits, logic, memory, operating system, one or more cores computer, a graphic processor, a digital signal processor, or the like.

In some demonstrative embodiments, payment elements issuer module 130 may be implemented by software and/or by hardware and/or by a combination of software and hardware.

In some demonstrative embodiments, communication unit 125 may include at least one of a wireless local area network (WLAN) transceiver, local area transceiver (LAN), a cellular transceiver, a short-range communication transceiver, e.g., near field communication (NFC) transceiver, satellite transceiver and the like.

In some demonstrative embodiments, processing circuitry 120 may be configured to issue a payment element 132 for performing one or more payments over a communication network, wherein the payment element 132 may include a user identification string 135. For example, processing circuitry 120 may be configured to operate the payment elements issuer module 130 to issue the payment element 132 that may include the user identification (ID) string 135. For example, the user ID string 135 may be encrypted and may include at least one of: user identification number, a user code, an account number and/or a telephone number.

In some demonstrative embodiments, processing circuitry 120 may be configured to send the payment element 132 with the user identification string 135 to a user application 155 installed on a user device 150. For example, the user application 150 may include a digital wallet, if desired.

In some demonstrative embodiments, the user device 140 may include a processing circuitry 145 and a communication unit 160. For example, processing circuitry 145 may include circuits, logic, memory, operating system, one or more cores computer, a graphic processor, a digital signal processor, or the like. For example, the communication unit 160 may include at least one of a wireless local area network (WLAN) transceivers, a local area transceiver (LAN), a cellular transceiver, a short-range communication transceiver, e.g., near field communication (NFC) transceiver, satellite transceiver and the like.

In some demonstrative embodiments, when a payment is made by the user device 140, at a payment receiving unit 165, for example, by providing the user ID string to the receiving unit 165 and/or to a payment terminal (not shown) at the merchant point of sale (POS). The processing circuitry 120 may be configured to receive a payment request message 180 from the payment receiving unit 165, and in response, may send a purchase approval request message 190 to a user account holder server 170. For example, the payment receiving unit 165 may include a payment terminal, a digital wallet, a bank, a bank hub, a cryptographic coins wallet, a blockchain server, or the like. The payment receiving unit 165 may be implemented by hardware, software and/or any combination of hardware and software.

In some demonstrative embodiments, the user account holder server 170 may include a payment approval module 172. The payment approval module 172 may be configured to generate an approval confirmation message 195. For example, the user account holder server 170 may include a bank, a bank hub, a cryptographic coin account, and any other type of account. It should be understood that payment approval module 172 may be implemented by software and/or by hardware and/or by a combination of software and hardware.

For example, the payment request message 180 may include a user identification string, a requested payment amount, payee data, and some other data if desired.

For example, the payment approval request message 190 may include a user identification string, a requested payment amount, payee data, and other data if desired.

For example, the approval confirmation message 195 may include a date of the payment, user data, the account holder data, payment receiver data, the requested amount for payment, and any other data if desired.

In some demonstrative embodiments, the processing circuitry 120 may be configured to send a reply message 185 as a response to the purchase approval request message 190 to the payment receiving unit 165.

For example, the reply message 185 may include approval or denial indication, the user data, date of payment, the requested payment amount, payee data, and/or any other data if desired. For example, when the reply message includes an approval message 185, the processing circuity 120 may be configured to send the requested payment to the payment receiving unit 165 and may receive from the user account holder server 170 a payment based on the requested payment. In contrast, when the reply message 185 includes a denial message, the processing circuity 120 may be configured to send a denial message (not shown) to the payment receiving unit 165.

In some other demonstrative embodiments, when the reply message 185 includes an approval message (not shown), e.g., an indication of payment approval, the processing circuity 120 may be configured to send the payment request message 180 to the user account holder server 170 and may receive a payment confirmation message from the user account holder server 170.

In one demonstrative embodiment, after the payment process has been completed, the processing circuit 120 may be configured to request deletion of the payment element 155 from the user device 150 and may issue a new payment element to be used at the next payment. For example, the new payment element may include a new user ID string. The processing circuitry 120 may send the new payment element to the user application 150 at the user device 140.

In one other embodiment, only the user ID string may be replaced at the user application 150 by a new user ID string.

In some other embodiments, the payment element 132 and the user ID string may remain after the completion of the payment process.

Advantageously, system 100 may be configured to receive payments from users, e.g., by a digital wallet application using the user ID string 135, in a simple way as is paid today on the standards of credit card companies. System 100 may provide the ability for users to easily pay for products and services in stores and online through their bank accounts, in the same way that it is customary today to pay for them through credit card systems.

In some demonstrative embodiments, system 100 includes an infrastructure with a high level of security that relies on encrypted payment elements, which may be produced by a central system that controls the payment requested data elements. System 100 may issue a unique user ID string 135 of payment for each and every transaction, thus increasing the security of the transaction, and provides an excellent model for each transaction having its own "address" and its own definition In some demonstrative embodiments, system 100 is configured to produce "means of payment" per transaction and per customer. System 100 infrastructure may not require a unique integration for each and every fund and may operate generically on all funds and/or payment systems without limitation of the type of business, the fund, its hardware, its software, etc.

In some demonstrative embodiments, system 100 is configured to connect the banking system to the world of payments in businesses, e.g., in stores and/or online, without the need to create complicated and new systems for every business and without the need to duplicate the systems in businesses. System 100 may be a generic system that is suitable for everyone and configured to connect the banking system to businesses, for example, for payment directly from bank accounts.

Figure 2:
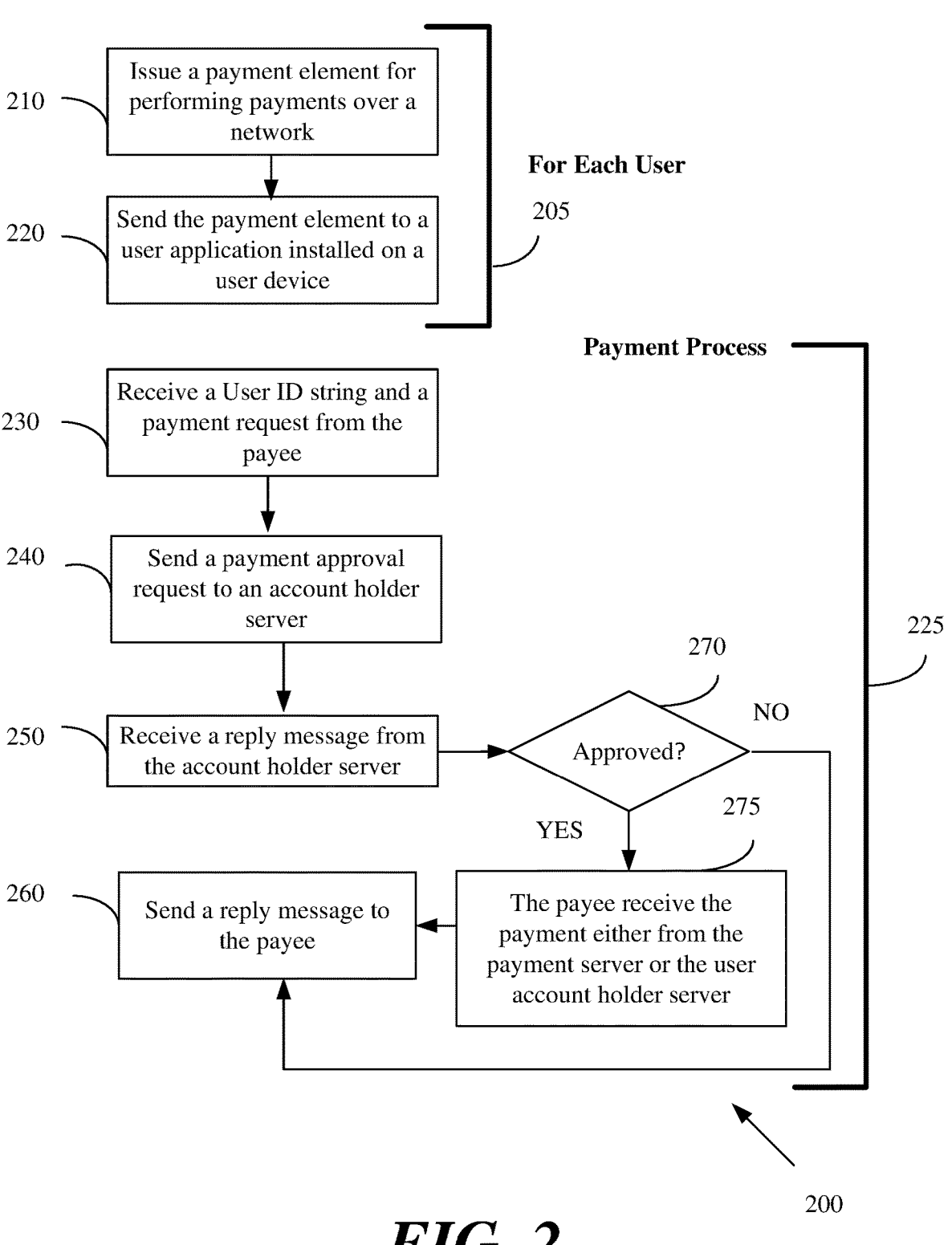
FIG. 2 illustrates a flow chart of a method for performing payments over a network, according to one demonstrative embodiment.

According to some demonstrative embodiments, a reference is now made to FIG. 2, which illustrates a flow chart of a method 200 for performing payments over a network 200. For each user 205, that may pay over a communication network, a server. e.g., payment manager server 110 (FIG. 1) may issue a payment element, e.g., payment element 132 (FIG. 1), for performing a payment (text box 210). For example, the payment element may include a user ID string, e.g., user ID string 135 (FIG. 1). The payment element may be sent to a user device, e.g., user device 140 (FIG. 1), and may be installed and/or loaded to the user application, e.g., application 155 (FIG. 1), (text box 220.)

In some demonstrative embodiments, a payment process 225 may start at the payment manager server when the server may receive the user ID string followed by a payment request, e.g., payment request 180 (FIG. 1) from the payee (text box 230.) In response to the payment request, the server may send a payment approval request, e.g., payment approval request 190 (FIG. 1), to the account holder server, e.g., account holder server 170 (FIG. 1), (text box 240.)

In some demonstrative embodiments, the payment manager server may receive a reply message, e.g., reply message 185 (FIG. 1), from the account holder server (text box 250.) When the reply message may indicate that the requested payment is approved (text box 270), the payee may receive the payment either from the payment manager server or from the account holder server (text box 275).

In some demonstrative embodiments, the payment manager server may send a payment confirmation message to the payee (text box 260). It should be understood that the above-described method 200 may be applied for every payment request.

According to some other demonstrative embodiments, a reference is now made to FIG. 3, which illustrates a flow chart of a method 300 for performing payments over a network. For each user 305, that may pay over a communication network, a server. e.g., payment manager server 110 (FIG. 1) may issue a payment element, e.g., payment element 132 (FIG. 1), for performing a payment (text box 310). For example, the payment element may include a user ID string, e.g., user ID string 135 (FIG. 1). The payment element may be sent to a user device, e.g., user device 140 (FIG. 1), and may be installed and/or loaded to the user application, e.g., application 155 (FIG. 1), (text box 320.)

In some demonstrative embodiments, a payment process 325 may start at the payment manager server when the server may receive the user ID string followed by a payment request, e.g., payment request 180 (FIG. 1) from the payee (text box 330.) In response to the payment request, the server may send a payment approval request, e.g., payment approval request 190 (FIG. 1), to the account holder server, e.g., account holder server 170 (FIG. 1), (text box 340.)

In some demonstrative embodiments, the payment manager server may receive a reply message, e.g., reply message 185 (FIG. 1) that approved the payment, from the account holder server (text box 350.) In response, the payment manger server may send the requested payment to the payee (text box 360) and, in return, receive the amount of payment paid to the payee from the user account holder server (text box 370.)

In some demonstrative embodiments, the payment manager server may send a request to delete the payment element or the user ID string or both and may issue a new payment element or a new user ID string or both (text box 380). It should be understood that the above-described method 300 may be applied for every payment request.

Figure 4:
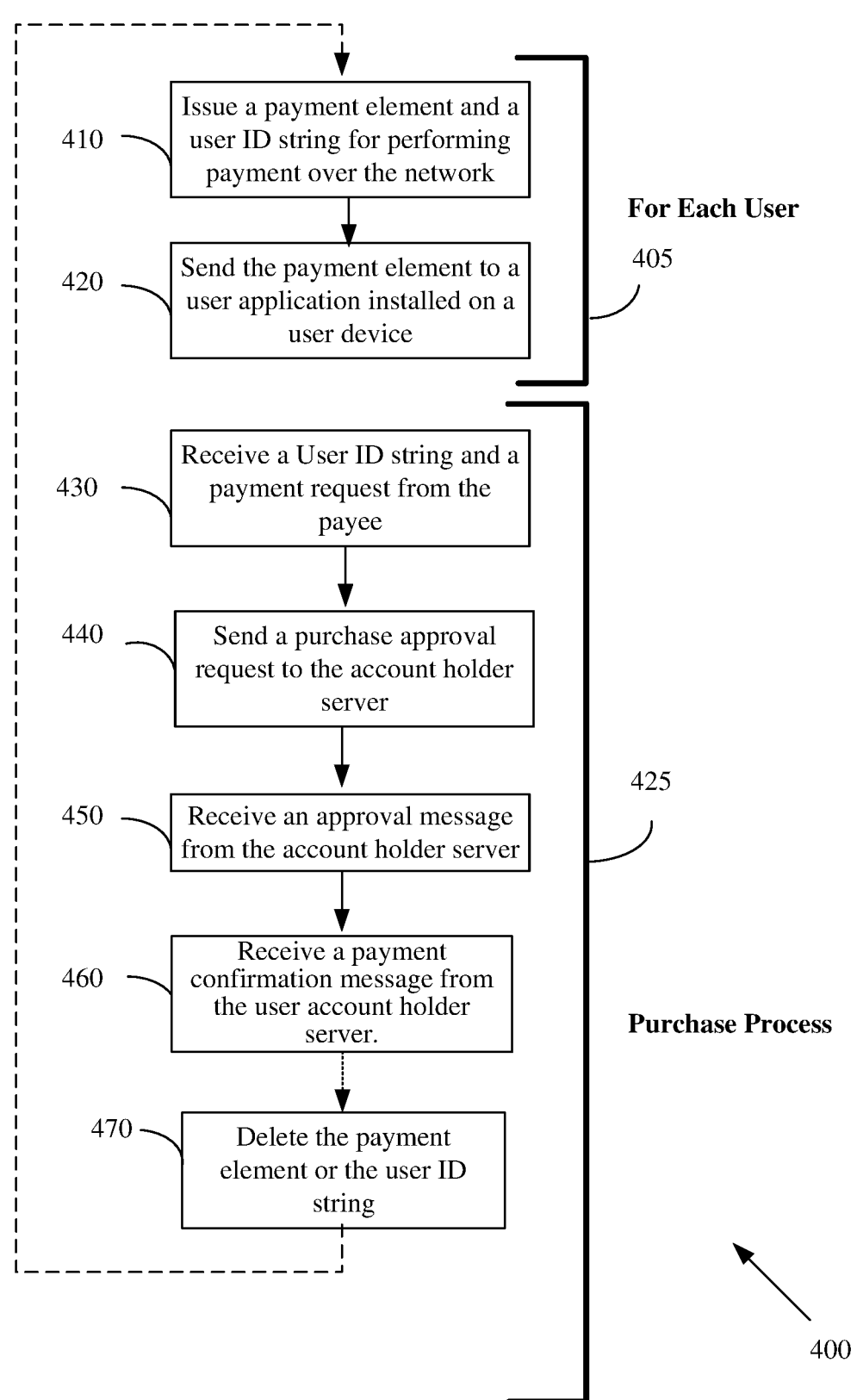
FIG. 4 illustrates a flow chart of a method for performing payments over a network, according to a third demonstrative embodiment.

According to some other demonstrative embodiments, a reference is now made to FIG. 4, which illustrates a flow chart of a method 400 for performing payments over a network. For each user 405, that may pay over a communication network, a server. e.g., payment manager server 110 (FIG. 1) may issue a payment element, e.g., payment element 132 (FIG. 1), for performing a payment (text box 410). For example, the payment element may include a user ID string, e.g., user ID string 135 (FIG. 1). The payment element may be sent to a user device, e.g., user device 140 (FIG. 1), and may be installed and/or loaded to the user application, e.g., application 155 (FIG. 1), (text box 420.)

In some demonstrative embodiments, a payment process 425 may start at the payment manager server when the server may receive the user ID string followed by a payment request, e.g., payment request 180 (FIG. 1) from the payee (text box 430.) In response to the payment request, the server may send a payment approval request, e.g., payment approval request 190 (FIG. 1), to the account holder server, e.g., account holder server 170 (FIG. 1), (text box 440.)

In some demonstrative embodiments, the payment manager server may receive a reply message, e.g., reply message 185 (FIG. 1) that approved the payment, from the account holder server (text box 450.) In this embodiment, the payment may be done, for example, by the user account holder server and the payment manger server may receive a payment confirmation message from the user account holder server (text box 460.) For example, the payment confirmation message may include an indication of the amount of payment paid to the payee In some demonstrative embodiments, the payment manager server may send a request to delete the payment element or the user ID string or both and may issue a new payment element or a new user ID string or both (text box 470). It should be understood that the above-described method 400 may be applied for every payment request.

Figure 5:
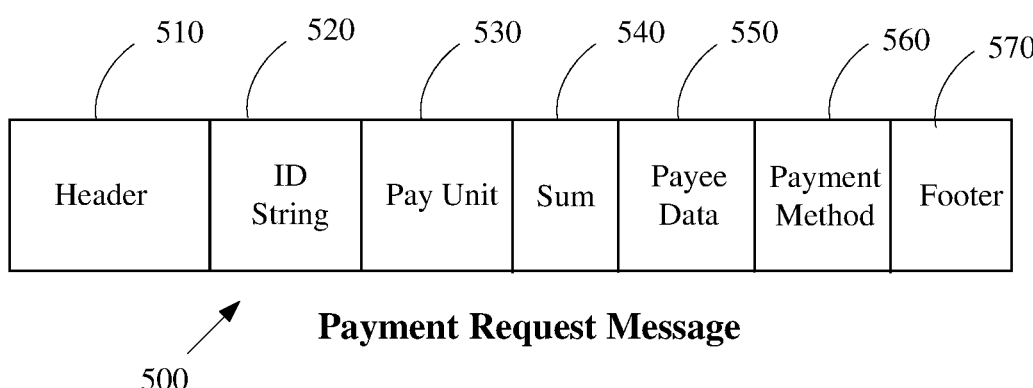
FIG. 5 illustrates a frame structure of a payment request message, according to some other demonstrative embodiments.

According to some other demonstrative embodiments, reference is now made to FIG. 5, a schematic illustration of a frame structure of a payment request message 500. In some demonstrative embodiments, payment request message 500 may include, for example, the following fields: a header 510, a user ID string 520, a payment unit 530, a sum of a requested payment 540, payee data 550, a payment method 560, and a footer 570. It should be understood that the described above is an example only, and other fields may be included in the payment request message.

In some demonstrative embodiment, the header 510 may include a message ID and any other fields. The user ID string 520 may include, for example, a user identification number, a user code, an account number and a telephone number and/or any other data. The payment unit 530 may include the coin type, for example, Dolar, Euro, Crypto, and the like. The sum field 540 may include the requested amount of payment. The payee data field 550 may include, for example, the payee name, the payee ID, the payee bank account number, the payee IBAN, the payee SWIPT, and the like. The payment method filed 560 may include, for example, the number of payments, credit payment, debit payment, money transfer, and the like. The footer 570 may include, for example, an error detection number, an error correction number, and the like.

Figure 6:
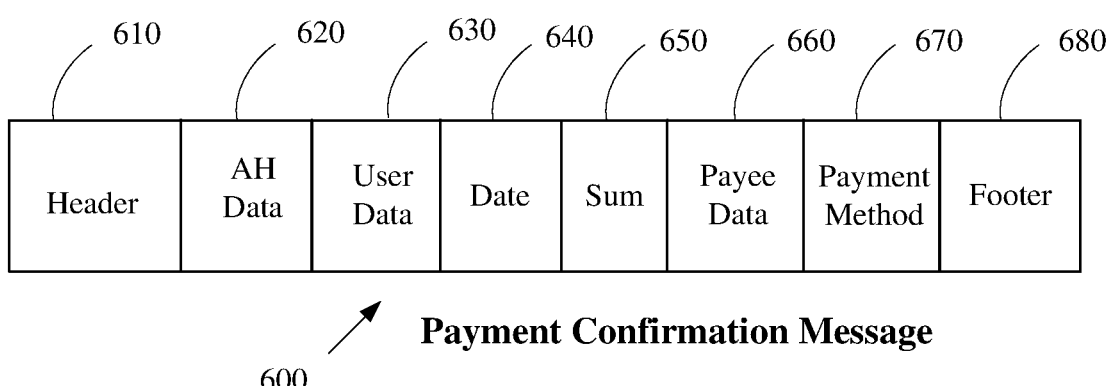
FIG. 6 illustrates a frame structure of a payment confirmation message, according to some other demonstrative embodiments.

According to some other demonstrative embodiments, reference is now made to FIG. 6, a schematic illustration of a frame structure of a payment confirmation message 600. In some demonstrative embodiments, payment confirmation message 600 may include, for example, the following fields: a header 610, an account holder server data 620, a user data 630, a date of payment 640, a sum of a requested payment 650, payee data 660, a payment method 670, and a footer 680. It should be understood that the described above is an example only, and other fields may be included in the payment request message.

In some demonstrative embodiment, the header 610 may include a message ID and any other fields. The user account holder data 620, may include, for example, the server IP address, user account ID, or the like. The user data field 630 may include the user ID string, the user bank account data, and the like. The date field 640 may include the date and time of a transaction and the like. The payment unit 640 may include the coin type, for example, Dolar, Euro, Crypto, and the like. The sum field 650 may include the requested amount of payment. The payee data field 660 may include, for example, the payee name, the payee ID, the payee bank account number, the payee IBAN, the payee SWIPT, and the like. The payment method filed 670 may include, for example, the number of payments, credit payment, debit payment, money transfer, and the like. The footer 670 may include, for example, an error detection number, an error correction number, and the like.

Figure 7:
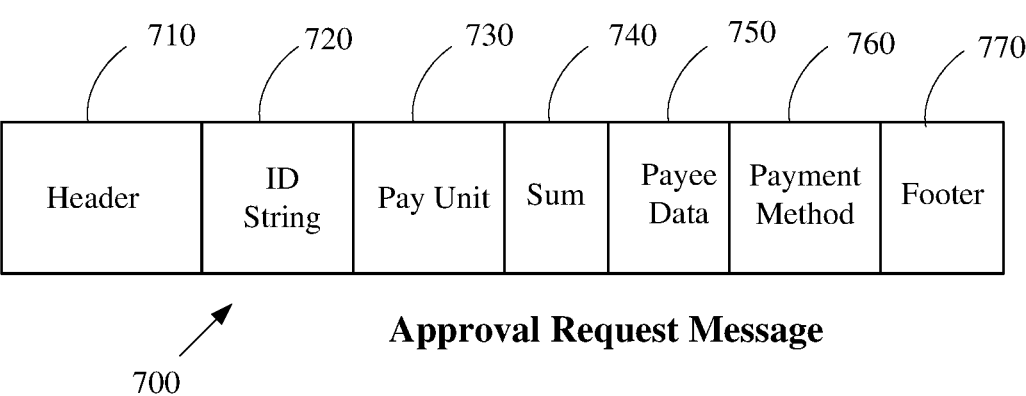
FIG. 7 illustrates a frame structure of an approval request message, according to some other demonstrative embodiments.

According to some demonstrative embodiments, reference is now made to FIG. 7, a schematic illustration of a frame structure of an approval request message 700. In some demonstrative embodiments, approval request message 700 may include, for example, the following fields: a header 710, a user ID string 720, a payment unit 730, a sum of a requested payment 740, payee data 750, a payment method 760, and a footer 770. It should be understood that the described above is an example only, and other fields may be included in the payment request message.

In some demonstrative embodiment, the header 710 may include a message ID and any other fields. The user ID string 720 may include, for example, a user identification number, a user code, an account number and a telephone number and/or any other data. The payment unit 730 may include the coin type, for example, Dolar, Euro, Crypto, and the like. The sum field 740 may include the requested amount of payment. The payee data field 750 may include, for example, the payee name, the payee ID, the payee bank account number, the payee IBAN, the payee SWIPT, and the like. The payment method filed 760 may include, for example, the number of payments, credit payment, debit payment, money transfer, and the like. The footer 770 may include, for example, an error detection number, an error correction number, and the like.

Figure 8:
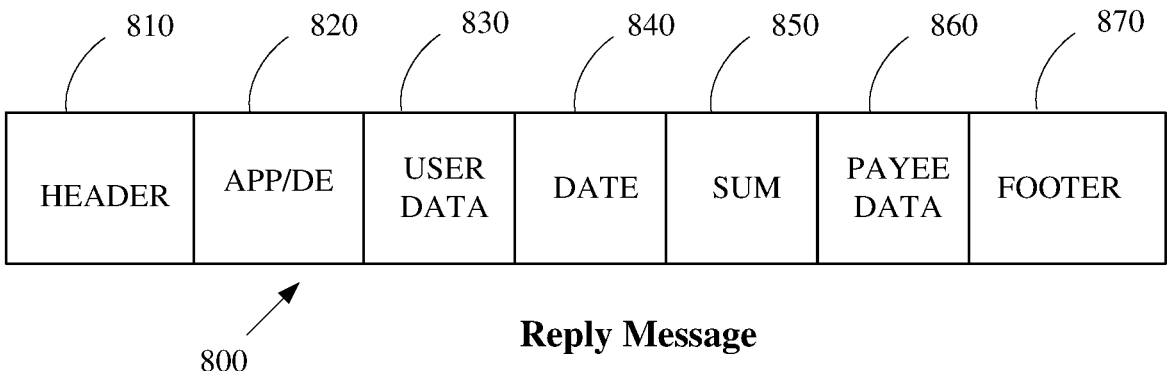
FIG. 8 illustrates a frame structure of a reply message, according to some other demonstrative embodiments.

According to some demonstrative embodiments, reference is now made to FIG. 8, a schematic illustration of a frame structure of a reply message 800. In some demonstrative embodiments, reply message 800 may include, for example, the following fields: a header 810, an approval/deny field 820, a user data field 830, a date field 840, a sum of a requested payment 850, a payee data field 860, and a footer 870. It should be understood that the described above is an example only, and other fields may be included in the payment request message.

In some demonstrative embodiment, the header 810 may include a message ID and any other fields. The approval/deny field 820 may include an approval flag and/or denial flag and/or any other indication. The user data field 830 may include the user ID string, the user bank account data, and the like. The date field 840 may include the date and time of a transaction and the like. The sum field 850 may include the requested amount of payment. The payee data field 860 may include, for example, the payee name, the payee ID, the payee bank account number, the payee IBAN, the payee SWIPT, and the like. The footer 870 may include, for example, an error detection number, an error correction number, and the like.

Figure 9:
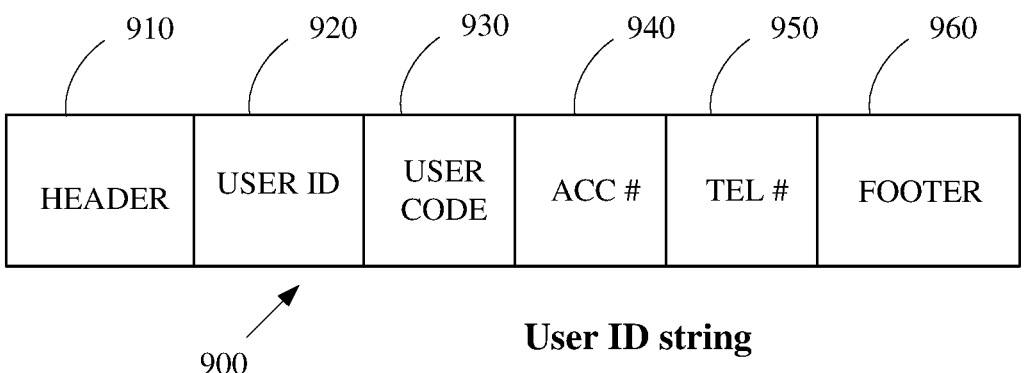
FIG. 9 illustrates a frame structure of a user identification string, according to some demonstrative embodiments.

According to some demonstrative embodiments, reference is now made to FIG. 9, a schematic illustration of a frame structure of a user ID string 900. In some demonstrative embodiments, user ID 900 may include a header 910, a user ID 920, a user code 930, a user paying account number 940, a user telephone number 950, and a footer 960.

In some demonstrative embodiment, the header 910 may include a message ID and any other fields. The user ID field 920 may include, for example, a national security number, a driving license number, a passport number, an ID number, or the like. The user code field 830 may include, for example, a personal code issued for the user or the like. The user paying account number field 940 may include, for example, the user bank account number or the like. The telephone number field 950 may include, for example, a user cellphone number, a user office telephone, a user wired telephone number, or the like. The footer 960 may include, for example, an error detection number, an error correction number, and the like.

In some demonstrative embodiment, the user ID string 940 may be included in protocol messages, for example, payment request massage 500 (FIG. 5), approval request message 700 (FIG. 7), payment element 155 (FIG. 1), and the like.

Figure 10:
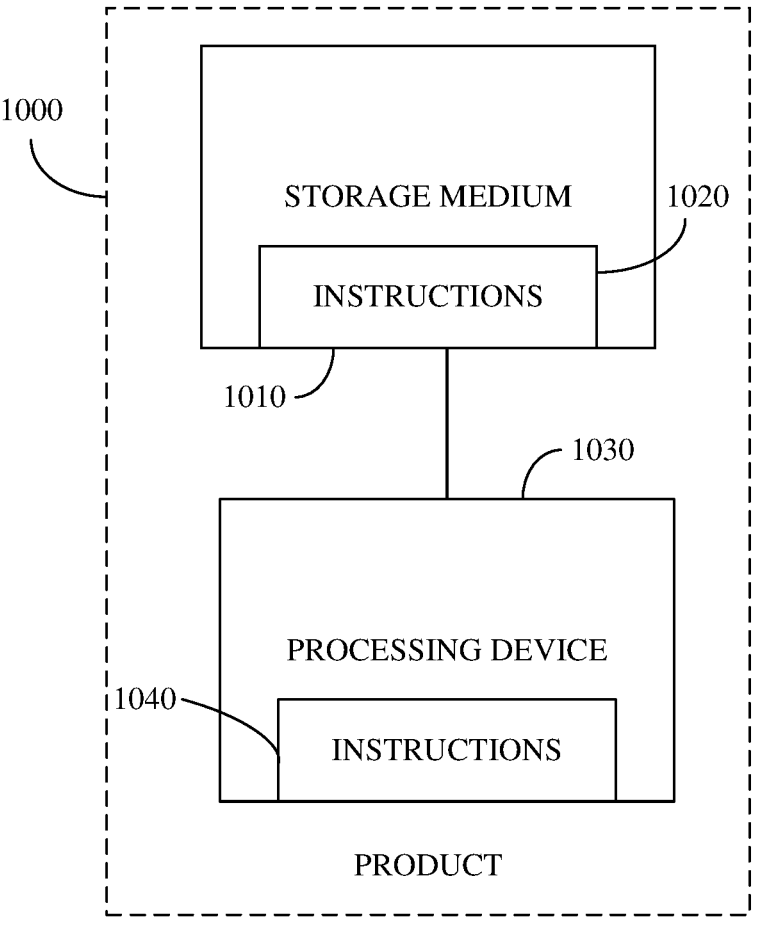
FIG. 10 illustrates a product of manufacture, according to some demonstrative embodiments.

According to some demonstrative embodiments, reference is made to FIG. 10, which is a schematic illustration of a product of manufacture 1000. Product 1000 may include one or more tangible computer-readable non-transitory storage media 1010, which may include computer-executable instructions 1030, implemented by processing device 1020, operable to, when executed by at least one computer processor, enable the at least one processing circuitry 120 (FIG. 1) to implement one or more program instructions for purchasing goods and/or services over the network and/or to perform, trigger and/or implement one or more operations, communications and/or functionalities as described above with reference to FIGS. 1-9. The phrase "non-transitory machine-readable medium" is directed to include all computer-readable media, with the sole exception being a transitory propagating signal.

In some demonstrative embodiments, product 1000 and/or machine-readable storage medium 910 may include one or more types of computer-readable storage media capable of storing data, including volatile memory, non-volatile memory, removable or non-removable memory, erasable or non-erasable memory, writeable or re-writeable memory, and the like. For example, machine-readable storage medium 510 may include any type of memory, such as, for example, RAM, DRAM, ROM, programmable ROM (PROM), erasable programmable ROM (EPROM), electrically erasable programmable ROM (EEPROM), Flash memory, a hard disk drive (HDD), a solid-state disk drive (SDD), fusen drive, and the like. The computer-readable storage media may include any suitable media involved with downloading or transferring a computer program from a remote computer to a requesting computer carried by data signals embodied in a carrier wave or other propagation medium through a communication link, e.g., a modem, radio, or network connection.

In some demonstrative embodiments, processing device 1020 may include logic. The logic may include instructions, data, and/or code, which, if executed by a machine, may cause the machine to perform a method, process and/or operations as described herein. The machine may include, for example, any suitable processing platform, computing platform, computing device, processing device, a computing system, processing system, computer, processor, or the like, and may be implemented using any suitable combination of hardware, software, firmware, and the like.

In some demonstrative embodiments, processing device 1020 may include or may be implemented as software, firmware, a software module, an application, a program, a subroutine, instructions, an instruction set, computing code, words, values, symbols, and the like. Instructions 1040 may include any suitable types of code, such as source code, compiled code, interpreted code, executable code, static code, dynamic code, and the like. Instructions may be implemented according to a predefined computer language, manner or syntax, for instructing a processor to perform a specific function. The instructions may be implemented using any suitable high-level, low-level, object-oriented, visual, compiled and/or interpreted programming languages, such as C, C++, C#, Java, Python, assembly language, machine code, and the like.

It is to be understood that the system and/or the method for generating a map of subsurface utilities is described hereinabove by way of example only. Other embodiments may be implemented based on the detailed description and the claims that followed.

It is to be understood that like numerals in the drawings represent like elements through the several figures and that not all components and/or steps described and illustrated with reference to the figures are required for all embodiments or arrangements.

It should also be understood that the embodiments, implementations, and/or arrangements of the systems and methods disclosed herein can be incorporated as a software algorithm, application, program, module, or code residing in hardware, firmware, and/or on a computer useable medium (including software modules and browser plug-ins) that can be executed in a processor of a computer system or a computing device to configure the processor and/or other elements to perform the functions and/or operations described herein.

It should be appreciated that according to at least one embodiment, one or more computer programs, modules, and/or applications that, when executed, perform methods of the present invention need not reside on a single computer or processor but can be distributed in a modular fashion amongst a number of different computers or processors to implement various aspects of the systems and methods disclosed herein.

Thus, illustrative embodiments and arrangements of the present systems and methods provide a computer-implemented method, computer system, and computer program product for processing code(s). The flowchart and block diagrams in the figures illustrate the architecture, functionality, and operation of possible implementations of systems, methods, and computer program products according to various embodiments and arrangements. In this regard, each block in the flowchart or block diagrams can represent a module, segment, or portion of code, which comprises one or more executable instructions for implementing the specified logical function(s).

It should also be noted that, in some alternative implementations, the functions noted in the block can occur out of order noted in the figures. For example, two blocks shown in succession may be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by particular purpose hardware-based systems that perform the specified functions or acts or combinations of specialized purpose hardware and computer instructions.

The terminology used herein is to describe particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein are for the purpose of description and should not be regarded as limiting. The use of "including," "comprising," or "having," "containing," "involving," and variations thereof herein is meant to encompass the items listed thereafter and equivalents thereof as well as additional items.

Figure 11:
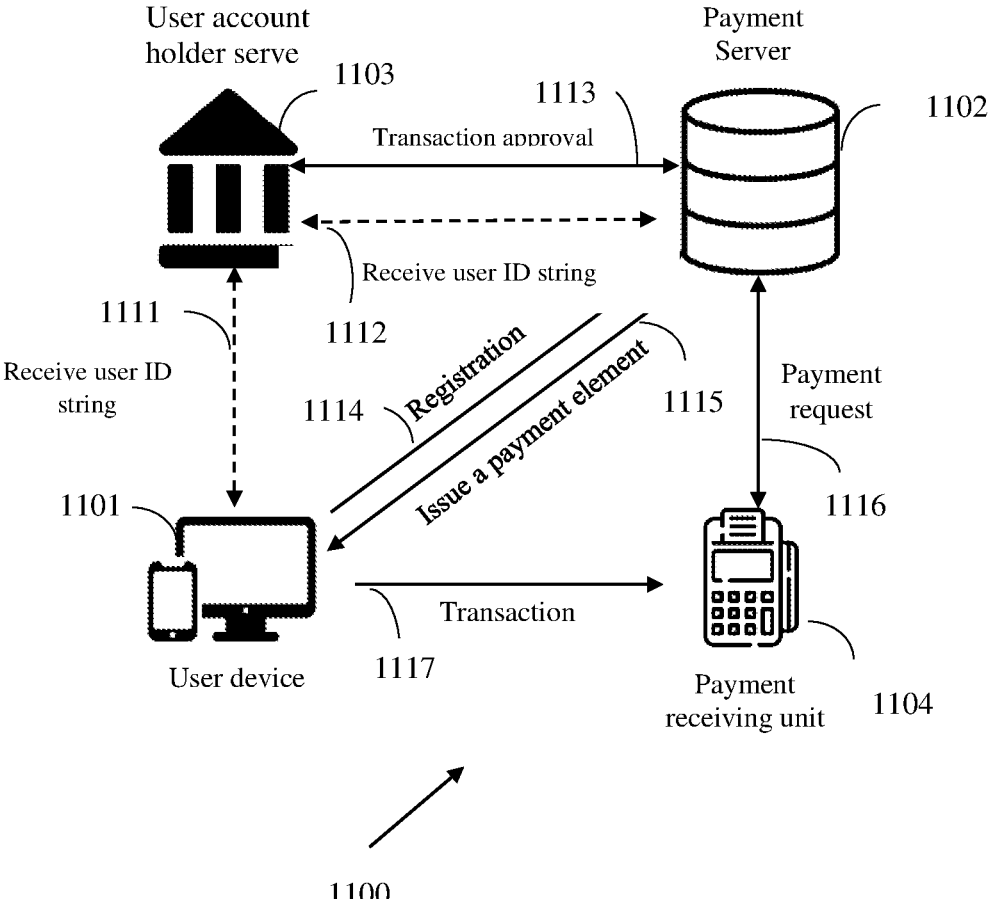
FIG. 11 illustrates a block diagram of another embodiment of a system for performing payments over a network according to some demonstrative embodiments.

Reference is now made to FIG. 11. FIG. 11 illustrates a block diagram of another embodiment of a system 1100 configured to perform payments over a network according to some demonstrative embodiments.

In some demonstrative embodiments, system 1100 may include a user device 1101. For example, the user device may include a payment application (not shown).

The payment application may be configured to perform payment at a point of sale and/or over the network by using a user identification (ID) string.

In some demonstrative embodiments, the user device 1101 may include a cellphone, a tablet, or a mobile computer, such as, for example, a laptop computer or the like.

In some demonstrative embodiments, system 1100 may include a payment server 1102. For example, the payment server 1102 may be configured to pay for purchases done by the payment application and/or to request from another device to execute the payment at the POS.

In some demonstrative embodiments, system 1100 may include a user account holder server 1103. For example, the user account holder server 1103 may be a bank, a bank hub, a loyalty club server, and the like.

In some demonstrative embodiments, a user device 1101, for example, a mobile device, a cellphone, or the like, may request from a user account server 1103 to issue a user ID string (dotted line 1111). The user device 1101 may perform registration to payment server 1102 (line 1114). For example, in this demonstrative embodiment, the user device 1101, when performing the registration, transfer the user ID string to payment server 1102 without exposing any other information about the user. In return, the payment server 1102 may issue a payment element (line 1115) to be downloaded to, for example, a payment application installed on the user device 1101.

In some other demonstrative embodiment, a user device 1101, for example, a mobile device, a cellphone, or the like, may perform registration to payment server 1102 (line 1114). For example, in this demonstrative embodiment, the user device 1101, when performing the registration, may provide use and/or details to payment server 1102. For example, the user information may include the user name, the user address, a user email address, a user ID number, a user bank account details and any other requested details. The payment server 1102 may deliver the user information to the user account server 1103 and may receive a user ID string (dotted line 1112). In return, the payment server 1102 may issue a payment element (line 1115) to be downloaded to, for example, a payment application installed on the user device 1101.

In some demonstrative embodiments, system 1100 may include a payment receiving unit 1104. For example, the payment receiving unit 1104 may include a payment terminal and/or cash register at the POS.

In some demonstrative embodiments, the payment server 1102 may send the payment element to a user application installed on the user device 1101. For example, the payment application may be configured to perform payment using the payment element at the payment receiving unit 1104.

In some demonstrative embodiments, the payment server 1102 may perform a payment transaction (line 1117) with the payment receiving unit 1104.

For example, the payment transaction (line 1117) may include sending a payment request message (line 1116) to the payment server 1102 and receiving at the payment server 1102 the payment request message (line 1116) from the payment receiving unit 1104. When the payment is made, the payment server 1102 may be configured to send a purchase approval request message (line 1113) to the user account holder server 1103 and to send a reply message (line 1113) as a response to the payment approval request to the payment receiving unit 1104.

In another demonstrative embodiment, the payment server 1102 may transfer the required payment to the payment receiving unit 1104.

The above-described system and method may enable a user of a payment application to purchase goods and services without a credit card and/or debit card and/or any other payment cards. The payment may be done directly from the user bank account without exposing his details and/or bank account details to the payment server and/or the payment receiving unit The subject matter described above is provided by way of illustration only and should not be construed as limiting. Various modifications and changes can be made to the subject matter described herein without following the example embodiments and applications illustrated and described and without departing from the true spirit and scope of the present invention, which is set forth in the following claims.

What is claimed is:

1. A system for performing payments over a network, comprising:

a user device, the using device having a user application installed on the user device;

a user account holder server;

a payment server comprising a processing circuitry and a tangible computer-readable non-transitory storage media comprising program instructions for performing payments over a communication network, wherein execution of the program instructions by the processing circuitry is configured to:

a) perform a registration session with the user device, including:

receive a user identification string from the user device without exposing user information about the user, and issue a payment element based on a user identification string received from the user device, wherein the payment element comprises encrypted information which comprises an information on a payment ability of a user formatted with surrogate primary account number values and the user identification string, and the payment element is configured to identify a user account at the user account holder server without exposing one or more details of the user to a payment receiving unit; and b) upon completion of the registration session, send the payment element to the user application installed on the user device in order to perform payment using the payment element at the payment receiving unit, wherein the payment element is downloaded and installed on the user application on the user device;

receive a payment request message from the payment receiving unit wherein a payment is made using the payment element at the payment receiving unit;

send a purchase approval request message to the user account holder server;

receive a payment confirmation message from the user account holder server; and send a reply message as a response to the payment approval request to the payment receiving unit; and c) after completion of the payment process, the payment server:

requests deletion of the payment element;

issues a new payment element for the user to be used at the next payment, wherein the new payment element comprises a new user identification string; and sends the new payment element to the user application.

2. The system of claim 1, wherein when the reply message comprises an approval message and the processing circuitry is configured to:

send the requested payment to the payment receiving unit; and receive from the user account holder server a payment based on the requested payment.

3. The system of claim 1, wherein the user identification string comprises at least one of:

a user identification number, a user code, a payment account number and a telephone number.

4. The system of claim 1, wherein the user identification string is encrypted.

5. The system of claim 1, wherein when the reply message comprises a denial message and the processing circuitry is configured to send a denial message to the payment receiving unit.

6. The system of claim 1, wherein when the reply message comprises an approval message, the processing circuitry is configured to:

send the payment request message to the user account holder server; and receive a payment confirmation message from the user account holder server.

7. The system of claim 1, wherein the payment request message comprises:

the user identification string, a requested amount of payment, a payment method, and payee data.

8. The system of claim 1, wherein the payment confirmation message comprises at least one of a date of the payment, user data, account holder details, payee data, a payment method and a requested amount for payment to a payee.

9. The system of claim 1, wherein the approval request message comprises at least the user identification string, payee data, a payment method and a requested amount of payment.

10. The system of claim 1, wherein the user account holder comprises an at least one of: a bank and a bank hub.

11. The system of claim 1, wherein the user application comprises a digital wallet.

12. The system of claim 1, wherein the user device comprises at least one of a desktop computer, a laptop computer, a mobile device, or a cellphone.

13. The system of claim 1, wherein the user information comprises a user name, a user address, a user email address, a user identification number, and a user bank account details.

14. The payment server of claim 1, wherein the user information comprises a user name, a user address, a user email address, a user identification number, and a user bank account details.

15. A payment server comprising a processing circuitry and a tangible computer-readable non-transitory storage media comprising program instructions for performing payments over a communication network, wherein execution of the program instructions comprise:

a) performing a registration session with the user device, including:

receiving a user identification string from the user device without exposing user information about the user, and issuing a payment element based on a user identification string received from a user device, wherein the payment element comprises encrypted information which comprises an information on a payment ability of a user formatted with surrogate primary account number values and the user identification string, and the payment element configured to identify a user account at a user account holder server without exposing one or more details of the user to a payment receiving unit;

b) upon completion of the registration session, sending the payment element to the user application installed on a user device in order to perform payment using the payment element at the payment receiving unit, wherein the payment element is downloaded and installed on the user application on the user device;

receiving a payment request message from a payment receiving unit wherein a payment is made using the payment element at the payment receiving unit;

sending a purchase approval request message to the user account holder server;

receive a payment confirmation message from the user account holder server; and sending a reply message as a response to the payment approval request to the payment receiving unit, c) after completion of the payment process, the payment server:

requesting deletion of the payment element;

issuing a new payment element for the user to be used at the next payment, wherein the new payment element comprises a new user identification string; and sending the new payment element to the user application.

16. The payment server of claim 15, wherein when the reply message comprises an approval message, the execution of the program instructions comprises:

sending the requested payment to the payment receiving unit; and receiving from the user account holder server a payment based on the requested payment.

17. The payment server of claim 15, wherein the user identification string comprises at least one of:

a user identification number, a user code, an account number and a telephone number.

18. The payment server of claim 15, wherein when the reply message comprises a denial message, the execution of the program instructions comprises sending a denial message to the payment receiving unit.

19. The payment server of claim 15, wherein when the reply message comprises an approval message, the execution of the program instructions comprises:

sending the payment request message to the user account holder server; and receiving a payment confirmation message from the user account holder server.

20. The payment server of claim 15 wherein the payment request message comprises at least one of:

the user identification string, a requested amount of payment, a payment method, and the payee data.

21. The payment server of claim 15, wherein the payment confirmation message comprises at least one of a date of the payment, user data, account holder details, payee data, a payment method and a requested amount for payment to a payee.

22. The payment server of claim 15, wherein the approval request message comprises at least the user identification string, payee data, a payment method and a requested amount of payment.

23. The payment server of claim 15, further configured to:

perform a payment transaction with the payment receiving unit.

24. The payment server of claim 23, wherein the payment transaction comprises:

send a payment request message to the payment server;

receive at the payment server the payment request message from the payment receiving unit;

when a payment is made, the payment server is configured to send a purchase approval request message to the user account holder server; and send a reply message as a response to the payment approval request to the payment receiving unit.

* * * * *